United States Patent
Sridhar et al.

(10) Patent No.: US 9,338,020 B2
(45) Date of Patent: May 10, 2016

(54) SYSTEMS AND METHODS FOR INTEGRATED UNICAST AND MULTICAST TRAFFIC MANAGEMENT

(71) Applicant: Alcatel-Lucent USA Inc., Murray Hill, NJ (US)

(72) Inventors: Kamakshi Sridhar, Plano, TX (US); Tomas S. Young, Parisppany, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 352 days.

(21) Appl. No.: 13/934,668

(22) Filed: Jul. 3, 2013

(65) Prior Publication Data

US 2015/0009821 A1    Jan. 8, 2015

(51) Int. Cl.
| | |
|---|---|
| *H04W 28/00* | (2009.01) |
| *H04L 12/18* | (2006.01) |
| *H04W 28/02* | (2009.01) |
| *H04W 72/00* | (2009.01) |
| *H04W 72/04* | (2009.01) |

(52) U.S. Cl.
CPC ......... *H04L 12/189* (2013.01); *H04W 28/0252* (2013.01); *H04W 28/0289* (2013.01); *H04W 72/005* (2013.01); *H04W 72/0486* (2013.01)

(58) Field of Classification Search
CPC ....... H04L 12/189; H04L 12/28; H04L 12/56; H04L 47/806; H04W 28/0252; H04W 28/0289; H04W 72/005; H04W 72/0486; H04W 4/06; G06F 13/4022; H04N 7/173; H04N 21/654
USPC .............. 370/229–230, 203.1, 232–235, 253, 370/329, 389–392, 312, 385.21, 395.3, 412, 370/431
See application file for complete search history.

(56) References Cited

U.S. PATENT DOCUMENTS

| | | | | | |
|---|---|---|---|---|---|
| 7,286,547 | B2 * | 10/2007 | Tzeng | ..................... | H04L 47/10 370/412 |
| 2004/0042479 | A1 * | 3/2004 | Epstein | ............... | H04L 12/1845 370/432 |
| 2009/0003212 | A1 * | 1/2009 | Kwan | ................... | H04L 49/508 370/235 |
| 2009/0245155 | A1 * | 10/2009 | Fukunaga | ........... | H04W 72/005 370/312 |
| 2010/0115099 | A1 * | 5/2010 | Gu | ......................... | H04L 47/806 709/226 |
| 2012/0269110 | A1 * | 10/2012 | Walker | .................. | H04W 28/16 370/312 |
| 2013/0114497 | A1 * | 5/2013 | Zhang | ................. | H04W 72/005 370/312 |

OTHER PUBLICATIONS

3rd Generation Partnership Project; Technical Specification Group Radio Access Network; Evolved Universal Terrestrial Radio Access Network (E-UTRAN); x2 Application Protocol (X2AP) (Release 11), 3GPP TS, 36.423 V11.5.0 (Jun. 2013).

* cited by examiner

*Primary Examiner* — Mohamed Kamara
(74) *Attorney, Agent, or Firm* — Harness, Dickey & Pierce, P.L.C.

(57) ABSTRACT

Methods for managing network resources for multicast streams based on unicast load conditions of a base station in a communications network include monitoring unicast load conditions of the base station, and adjusting bearer properties for a multicast stream based on the unicast load conditions. A broadcast provisioning server (BPS) manages network resources for multicast streams based on unicast load conditions of a base station in a communications network. The BPS may be configured to monitor unicast load conditions of the base station and adjust bearer properties for a multicast stream based on the unicast load conditions.

16 Claims, 3 Drawing Sheets

SYSTEMS AND METHODS FOR INTEGRATED UNICAST AND MULTICAST TRAFFIC MANAGEMENT

BACKGROUND

Current wireless cellular systems are designed to serve user terminals and their applications, in order to allow the continuous streaming of data (e.g., voice and/or video) during a communications session. Additionally, communications networks may employ both unicast transmissions and multicast transmissions in order to provide data streams to the mobile terminals. Unicast transmissions may be defined as a one-to-one connection where data is sent to a single network destination identified by a unique address. Unicast-based media services may be used to provide a stream for a unique user being serviced by a base station. By contrast, multicast transmissions or streams deliver data to a group of destination computers or mobile devices (e.g., user equipment) simultaneously in a single transmission from a source (e.g., a base station). However, in current network resource scheduling schemes, the provisioning (i.e., preparing and equipping a network to provide services to users) of multicast streams is done independent of the provisioning of unicast streams.

The Long Term Evolution (LTE) wireless communications standard uses a Multimedia Broadcast Multicast Services (MBMS) called eMBMS, which is a multicast interface designed to provide broadcast services for users within a cell coverage area and for a core network. eMBMS defines bearer properties and communication session characteristics based on service level requirements and radio network configurations. Bearer properties are a set of network configurations that provide special treatment to certain types of data streams, such that some types of data streams are prioritized over other types of data streams.

Bearer properties may include a minimum guaranteed bit rate (GBR), a maximum bit rate (MBR), a quality of service (QoS) class identifier (QCI), an allocation and retention priority (ARP), and other like properties. The GBR defines a minimum amount of bandwidth that is reserved by the network for a multicast stream. GBR bearers are typically used for real-time services, such as video and voice streams. The MBR is defined as the maximum allowed non-GBR throughput that may be allocated to a stream. The QCI is a value that is assigned to each data stream, which denotes a set of transport characteristics for a data stream and is used to prioritize data streams based on a level of QoS required by the data stream.

Network providers may use a policy, which may be stored in a policy database, to define the bearer properties for data streams based on required QoS parameters. In typical LTE network architectures, a policy database may be used in conjunction with a broadcast multicast-service center (BMSC) to implement the policy in order to change bearer properties for multicast streams. In order to implement a policy for bearer properties, BMSCs are typically configured to create and control communications sessions by allocating network resources for data streams based on current broadcast traffic loading and current bearer properties.

However, BMSCs and policy databases do not take into account the current unicast load characteristics or current unicast traffic in order to allocate resources for multicast traffic. As a result, a carrier (i.e., a modulated signal used for communicating between a user equipment and base station) with high unicast loading may be provisioned with a high bit rate multicast session. In such instances, the combined multicast and unicast traffic could result in congestion that causes significant unicast load balancing to be invoked by a base station across multiple carriers, which may result in inter-frequency hard handovers (i.e., where a connection is broken before or during the connection is made). Load balancing across multiple carriers due to inter-frequency hard handovers may result in dropped calls, delay, jitter, and/or other like service interruptions. Furthermore, in many instances, the mismanagement of unicast and multicast traffic may result in inefficient network resource consumption, which, over time, may lead to cell overload conditions.

SUMMARY

At least one example embodiment relates to a method for managing network resources.

According to an example embodiment, a method for managing network resources for multicast streams based on unicast load conditions of a base station in a communications network includes monitoring unicast load conditions of the base station, and adjusting bearer properties for a multicast stream based on the unicast load conditions.

In one example embodiment, the monitoring may include receiving unicast load condition information from the base station. The base station may receive the unicast load condition information from a user equipment being serviced by the base station. The monitoring may include determining a unicast resource availability based on the received unicast load condition information and determining whether the unicast resource availability is one of above, equal to, and below a unicast load threshold.

In one example embodiment, the adjusting may decrease the bearer properties by a decrease amount if the unicast resource availability is determined to be above the unicast load threshold. The adjusting may increase the bearer properties by an increase amount if the unicast resource availability is determined to be below the unicast load threshold. Additionally, the adjusting may maintain the bearer properties if the unicast resource availability is determined to be equal to the unicast load threshold.

In one example embodiment, a policy may define the unicast load threshold, the increase amount, and the decrease amount.

In one example embodiment, the monitoring may further include receiving at least one quality of service (QoS) measurement from the base station. The base station may receive the QoS measurement from the user equipment being serviced by the base station. The monitoring may further include calculating at least one QoS value based on the QoS measurement and determining whether the QoS value is one of above, equal to, and below a QoS value threshold.

In one example embodiment, the adjusting may decrease the bearer properties by the decrease amount if the unicast resource availability is determined to be above the unicast load threshold and the QoS value is above the QoS value threshold. The adjusting may increase the bearer properties by the increase amount if the unicast resource availability is determined to be below the unicast load threshold and the QoS value is below the QoS value threshold. Additionally, the adjusting may maintain the bearer properties if one of (i) the unicast resource availability is determined to be equal to the unicast load threshold and (ii) the QoS value is determined to be equal to QoS value threshold.

In one example embodiment, the policy may further define the QoS value threshold and how to calculate the QoS value based on the QoS measurement. The policy may further define the QoS measurement being at least one of call drop rate, a signal to noise ratio, a measure of throughput, a delay, a jitter, and a handover success rate.

In one example embodiment, the bearer properties may comprise a guaranteed bit rate (GBR), and the policy may define the increase amount to include a GBR increase amount for increasing the GBR and the decrease amount to include a GBR decrease amount for decreasing the GBR.

In one example embodiment, the bearer properties may further comprise a maximum bit rate (MBR), and the policy may define the increase amount to include a MBR increase amount for increasing the MBR and the decrease amount to include a MBR decrease amount for decreasing the MBR.

In one example embodiment, the bearer properties may further comprise a QoS class identifier (QCI), and the policy may define the increase amount to include a QCI increase amount for increasing the QCI and the decrease amount to include a QCI decrease amount for decreasing the QCI.

At least one example embodiment relates to a broadcast provisioning server.

In one example embodiment, the broadcast provisioning server (BPS) manages network resources for multicast streams based on unicast load conditions of a base station in a communications network. The BPS may be configured to monitor unicast load conditions of the base station and adjust bearer properties for a multicast stream based on the unicast load conditions.

In one example embodiment, in the monitoring, the BPS may be configured to receive unicast load condition information from the base station. The base station may receive the unicast load condition information from a user equipment being serviced by the base station. The BPS may be configured to determine a unicast resource availability based on the received unicast load condition information and determining whether the unicast resource availability is one of above, equal to, and below a unicast load threshold.

In one example embodiment, the BPS may be configured to decrease the bearer properties by a decrease amount if the unicast resource availability is determined to be above the unicast load threshold. In the monitoring, the BPS may be configured to increase the bearer properties by an increase amount if the unicast resource availability is determined to be below the unicast load threshold. Additionally, BPS may be configured to maintain the bearer properties if the unicast resource availability is determined to be equal to the unicast load threshold.

In one example embodiment, a policy may define the unicast load threshold, the increase amount, and the decrease amount.

In one example embodiment, in the monitoring, the BPS may be configured to receive at least one quality of service (QoS) measurement from the base station. The base station may receive the QoS measurement from the user equipment being serviced by the base station. In the monitoring, the BPS may be configured to calculate at least one QoS value based on the QoS measurement and determine whether the QoS value is one of above, equal to, and below a QoS value threshold.

In one example embodiment, the BPS may be configured to decrease the bearer properties by the decrease amount if the unicast resource availability is determined to be above the unicast load threshold and the QoS value is above the QoS value threshold. The BPS may be configured to increase the bearer properties by the increase amount if the unicast resource availability is determined to be below the unicast load threshold and the QoS value is below the QoS value threshold. Additionally, the BPS may be configured to maintain the bearer properties if one of (i) the unicast resource availability is determined to be equal to the unicast load threshold and (ii) the QoS value is determined to be equal to QoS value threshold.

In one example embodiment, the policy may further define the QoS value threshold and how to calculate the QoS value based on the QoS measurement. The policy may further define the QoS measurement being at least one of call drop rate, a signal to noise ratio, a measure of throughput, a delay, a jitter, and a handover success rate.

In one example embodiment, the bearer properties may comprise a guaranteed bit rate (GBR), and the policy may define the increase amount to include a GBR increase amount for increasing the GBR and the decrease amount to include a GBR decrease amount for decreasing the GBR.

In one example embodiment, the bearer properties may further comprise a maximum bit rate (MBR), and the policy may define the increase amount to include a MBR increase amount for increasing the MBR and the decrease amount to include a MBR decrease amount for decreasing the MBR.

In one example embodiment, the bearer properties may further comprise a QoS class identifier (QCI), and the policy may define the increase amount to include a QCI increase amount for increasing the QCI and the decrease amount to include a QCI decrease amount for decreasing the QCI.

BRIEF SUMMARY OF THE DRAWINGS

The present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF THE EMBODIMENTS

Various example embodiments will now be described more fully with reference to the accompanying drawings in which some example embodiments of the invention are shown.

Detailed illustrative embodiments are disclosed herein. However, specific structural and functional details disclosed herein are merely representative for purposes of describing example embodiments of the present invention. This invention may, however, may be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams in order not to obscure the example embodiments in unnecessary detail. In other instances, well-known processes, structures and techniques may be shown without unnecessary detail in order to avoid obscuring example embodiments.

Also, it is noted that example embodiments may be described as a process depicted as a flowchart, a flow diagram, a data flow diagram, a structure diagram, or a block diagram. Although a flowchart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, a function, a procedure, a subroutine, a subprogram, etc. When a process corresponds to a function, its termination may correspond to a return of the function to the calling function or the main function.

Moreover, as disclosed herein, the term "memory" may represent one or more devices for storing data, including random access memory (RAM), magnetic RAM, core memory, and/or other machine readable mediums for storing information. The term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" may include, but is not limited to, portable or fixed storage devices, optical storage devices, wireless channels, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As used herein, the term "mobile terminal" may be considered synonymous to, and may hereafter be occasionally referred to, as a client, mobile, user terminal, mobile unit, mobile station, mobile user, user equipment (UE), subscriber, user, remote station, access agent, user agent, receiver, etc., and may describe a remote user of network resources in a communications network. Furthermore, the term "mobile terminal" may include any type of wireless/wired device such as consumer electronics devices, smart phones, tablet personal computers, personal digital assistants (PDAs), desktop computers, and laptop computers, for example.

As used herein, the term "network element", may be considered synonymous to and/or referred to as a networked computer, networking hardware, network equipment, router, switch, hub, bridge, gateway, or other like device. The term "network element" may describe a physical computing device of a wired or wireless communication network and configured to host a virtual machine. Furthermore, the term "network element" may describe equipment that provides radio baseband functions for data and/or voice connectivity between a network and one or more users. The term "network element", may be considered synonymous to and/or referred to as a "base station". As used herein, the term "base station", may be considered synonymous to and/or referred to as an enhanced or evolved Node B (eNB), base transceiver station (BTS), NodeB, access point (AP), etc. and may describe equipment that provides the radio baseband functions for data and/or voice connectivity between a network and one or more users.

Example embodiments may be utilized in conjunction with radio access networks (RANs) such as: Universal Mobile Telecommunications System (UMTS); Global System for Mobile communications (GSM); Advance Mobile Phone Service (AMPS) system; the Narrowband AMPS system (NAMPS); the Total Access Communications System (TACS); the Personal Digital Cellular (PDC) system; the United States Digital Cellular (USDC) system; the code division multiple access (CDMA) system described in EIA/TIA IS-95; a High Rate Packet Data (HRPD) system, Worldwide Interoperability for Microwave Access (WiMAX); ultra mobile broadband (UMB); $3^{rd}$ Generation Partnership Project LTE (3GPP LTE); and $4^{th}$ Generation LTE.

Figure 1:
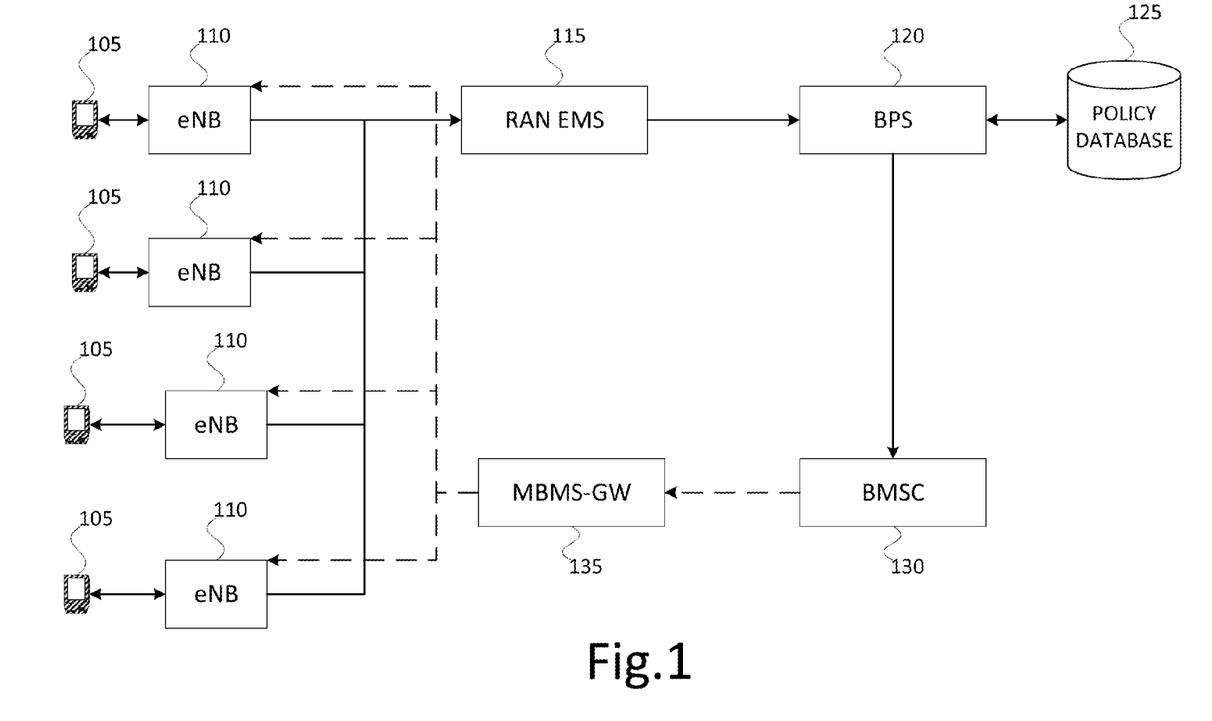
FIG. 1 illustrates an example of a communications network, according to an example embodiment.

Exemplary embodiments are discussed herein as being implemented in a suitable computing environment. Although not required, exemplary embodiments will be described in the general context of computer-executable instructions, such as program modules or functional processes, being executed by one or more computer processors (CPUs). Generally, program modules or functional processes include routines, programs, objects, components, data structures, etc. that performs particular tasks or implement particular data types. The program modules and functional processes discussed herein may be implemented using existing hardware in existing communication networks. For example, program modules and functional processes discussed herein may be implemented using existing hardware at existing network elements or control nodes (e.g., BPS 120 as shown in FIG. 1). Such existing hardware may include one or more digital signal processors (DSPs), application-specific-integrated-circuits, field programmable gate arrays (FPGAs) computers or the like.

FIG. 1 illustrates an example of a communications network, according to an example embodiment. A communications network 100 includes user terminals 105, evolved node Bs (eNBs) 110, radio access network element management system (RAN EMS) 115, broadcast provisioning server (BPS) 120, policy database 125, broadcast multicast-service center (BMSC) 130, and Multimedia Broadcast Multicast Services Gateway (MBMS-GW) 135.

Each of the mobile terminals 105 may include a transceiver, memory, and processor. Mobile terminals 105 may be configured to send/receive data to/from eNBs 110. Mobile terminals 105 may be designed to sequentially and automatically carry out a sequence of arithmetic or logical operations; equipped to record/store digital data on a machine readable medium; and transmit and receive digital data via eNBs 110. Mobile terminals 105 may include wireless phones, laptop personal computers, tablet personal computers, and/or any other physical or logical device capable of recording, storing, and/or transferring digital data via eNB 110. Each of the mobile terminals 105 may include a wireless transceiver configured to operate in accordance with the IEEE 802.11-2007 standard (802.11) or other like wireless standards. Furthermore, mobile terminals 105 may be configured to measure and/or record network loading information, QoS parameters, and/or other like characteristics. Network loading information may include a received signal strength indicator (RSSI), received channel power indicator (RCPI), a path loss measurement, packet delay time, and/or other like information that may indicate a level or amount of traffic in a communications network. QoS parameters may include a call drop rate, a signal to noise ratio, a measure of throughput, a delay, a jitter, a handover success rate, a service response time, a number of interrupts, and/or other like parameters. Furthermore, mobile terminals 105 may be configured to transmit the measured and/or recorded network loading information, QoS parameters, and other like characteristics to eNBs 110.

eNBs 110 may be configured to provide wireless communication services to mobile terminals within a geographic area, or cell coverage area, associated with the eNBs 110. The eNBs 110 may provide wireless communication services to mobile terminals 105 via a link for each user terminal 105. Links between eNBs 110 and each of the mobile terminals 105 may include one or more downlink (or forward) channels for transmitting information from eNBs 110 to mobile terminals 105 and one or more uplink (or reverse) channels for transmitting information from mobile terminals 105 to the eNBs 110. It should be noted that eNBs 110 may provide the same or similar wireless communications services to multiple mobile terminals and/or other like devices (e.g., autonomous sensors, Machine Type Communications (MTC) devices, machine to machine (M2M) devices, and the like).

In various embodiments, eNBs 110 may include a processor and transmitter/receiver connected to one or more antennas and an electronic switching function. The one or more transmitters/receivers may be configured to transmit/receive data signals to/from one or more user terminals 105 within its cell coverage area via one or more links that may be associated with a transmitter and a receiver. In various embodiments, eNBs 110 may be configured to operate a channel access method, such as code division multiple access (CDMA), orthogonal frequency-division multiple access (OFDMA), frequency division multiple access (FDMA), time division multiple access (TDMA), packet mode multiple-access, space division multiple access (SDMA), or other like channel access methods or combination thereof. In various embodiments, eNBs 110 may employ the E-UTRA protocols (i.e., OFDMA for downlink communications and SC-FDMA for uplink communications) using the LTE interface to connected with, or otherwise communicate with, mobile terminals 105.

In various embodiments, eNBs 110 may be configured to employ one or more wireless communications standards, such as CDMA, GSM, LTE, WiMAX, or other like wireless communications standard. eNBs 110 may also be configured to connect to a service provider's network via hard link, such as a packet switched network, a mobile switching center, or via other like connection means. The electronic switching function may be a "Mobile Switching Center" (MSC) when eNB 110 employs a GSM, AMPTS, NMT and CDMA system. Alternatively, a "Media Gateway" (MGW)/"Gateway MSC Server" (GMSC) may be used if eNB 110 employs a 3G/4G mobile system. In various embodiments, the aforementioned functions may be provided by separate components or devices.

In various embodiments, where eNBs 110 uses the LTE wireless communication protocol, eNBs 110 may comprise components of the System Architecture Evolution (SAE) with an Evolved Packet Core (EPC) as described by the 3rd Generation Partnership Project (3GPP). In such embodiments, eNBs 110 may include components such as a Mobility Management Entity (MME), Serving Gateway (SOW), PDN Gateway (PGW), Home Subscriber Server (HSS), Access Network Discovery and Selection Function (ANDSF), Evolved Packet Data Gateway (ePDG), and/or other like components as are known. In various embodiments, the aforementioned components may be employed by separate devices.

In various embodiments, eNBs 110 may be configured to operate a channel access method, such as code division multiple access (CDMA), orthogonal frequency-division multiple access (OFDMA), frequency division multiple access (FDMA), single-carrier FDMA (SC-FDMA), time division multiple access (TDMA), packet mode multiple-access, space division multiple access (SDMA), or other like channel access methods or combination thereof.

In various embodiments, eNBs 110 may be configured to operate a collision detection method, such as a carrier sense multiple access (CSMA) protocol, which is a probabilistic Media Access Control (MAC) protocol in which a device verifies the absence of other traffic before transmitting on a shared transmission medium. The CSMA protocol may employ a collision avoidance (CA) protocol, in which a device only transmits when a channel is sensed to be idle. Alternatively, the CSMA protocol may employ a collision detection (CD) protocol, in which a device terminates a transmission as soon as a collision is detected. However, embodiments are not limited to the collision detection methods described above and may encompass any type of collision detection method. Additionally, the CSMA protocol may be enhanced with a Request-to-Send/Clear-to-Send (RTS/CTS) protocol, in which a device wishing to send data initiates the process by sending a request to send frame (RTS) and the destination device replies with a clear to send frame (CTS).

RAN EMS 115 is a network element that may include one or more systems and/or applications for managing network elements (e.g., eNBs 110) in a communications network. RAN EMS 115 may include a processor, memory or computer readable storage medium, and transmitter/receiver connected to one or more antennas. In various embodiments, in order to manage the eNBs 110, RAN EMS 115 may employ a network management system (NMS) application. In such embodiments, RAN EMS 115 may be configured to perform fault, configuration, accounting, performance, and security (FCAPS) applications. According to various embodiments, RAN EMS 115 may be configured to manage the functions and capabilities within each eNB 110, but may not manage the traffic between different eNB 110 in communications network 100. In such embodiments, the RAN EMS 115 may communicate with higher-level network management elements, such as BPS 120.

BPS 120 is a network element that may include one or more systems and/or applications for allocating network resources for broadcast traffic (e.g., data streams). BPS 120 may include a processor, memory or computer readable storage medium, and transmitter/receiver connected to one or more antennas. In various embodiments, BPS 120 may be configured to operate a scheduling algorithm. The scheduling algorithm may describe a schedule for allocating network resources for the eNBs 110, such that each transmission or stream is assigned to a carrier at a specified time. Additionally, according to various embodiments, BPS 120 may be configured to receive network loading information, QoS parameters, and/or other like characteristics, as measured and/or recorded by the mobile terminals 105, and allocate network resources to one or more scheduled data streams based on the received network loading information, QoS parameters, and/or other like characteristics. Furthermore, BPS 120 may be connected to, or communicate with one or more local and/or remote databases (e.g., policy database 125).

Policy database 125 may be a physical or logical device capable of storing one or more collections of data. Accordingly, policy database 125 may be configured to store a policy for managing network traffic, service definitions, broadcast characteristics for each of the eNBs 110, and other like network related data. In various embodiments, policy database 125 may include a database management system (DBMS), a relational database management system (RDBMS), an object database (ODBMS), column-oriented DBMS, correlation database DBMS, federated database system (FDBS), and the like. In various embodiments, policy database 125 may be stored on or otherwise associated with one or more data storage devices. These data storage devices may include primary storage devices, secondary storage devices, non-linear storage devices, and/or other like data storage devices. Furthermore, policy database 125 may include one or more virtual machines, such that the physical data storage devices containing policy database 125 may be logically divided into multiple virtual data storage devices and/or databases. Alternatively, policy database 125 may reside on one physical hardware data storage device.

BMSC 130 is a network element that may include one or more systems and/or applications and serves as an entry-point for data stream delivery. BMSC 130 may be configured to establish and control eMBMS bearers and to deliver scheduled multicast transmissions. BMSC 130 may include a processor, memory or computer readable storage medium, and transmitter/receiver connected to one or more antennas. Additionally, BMSC 130 may be configured to communicate with the mobile terminals 105, via eNBs 110, in order to provide messages or other indicators that the mobile terminals 105 require in order to use eMBMS services. Such messages may include multicast service identifiers, IP multicast addresses, time of transmission, multicast stream service type, and other like information. BMSC 130 may also be configured to record and store records related to eMBMS services, such as an amount of data that one of the mobile terminals 105 streams, and the like. Furthermore, BMSC 130 may be configured to implement security features as specified by the 3GPP for multicast streams.

MBMS-GW 135 is a network element that may include one or more systems and/or applications for implementing a network traffic policy. MBMS-GW 135 may be configured to create and maintain network transport context and to distribute the network transport context to the eNBs 110. In some embodiments, MBMS-GW 135 may be configured to distribute data associated with the current bearer properties to eNBs 110. MBMS-GW 135 may include a processor, memory or computer readable storage medium, and transmitter/receiver connected to one or more antennas. According to various embodiments, MBMS-GW 135 may provide a MBMS bearer service and a MBMS user service.

The MBMS bearer service may include a multicast mode and a broadcast mode. The broadcast mode may include a stream or service that may be received by any subscriber located in an area where a service is offered (e.g., a cell coverage for one of the eNBs 110). The multicast mode may include a stream or service that is provided to users (i.e., mobile terminals 105) that have joined a multicast group associated with the stream or service. Both modes are unidirectional multicast transmission data streams, including multimedia such as text, audio, image, video, and the like. The multicast transmissions may be provided by a multicast service center (e.g., BMSC 130) to any user (e.g., mobile terminals 105) located within a designated service area. The MBMS bearer service may be configured to use IP multicast addresses for multicast streams.

The MBMS user service may act as a service layer by offering data streaming and/or a download delivery. Streaming methods may be used for continuous transmissions like mobile television or music streaming services. Download delivery methods may include services that allow a user to download a multicast stream to a mobile device (e.g., mobile terminals 105).

Referring to FIG. 1, according to various embodiments, communications network 100 may operate as follows. First, the eNBs 110 receive network loading information and/or QoS measurements from mobile terminals 105. Next, the RAN EMS 115 receives the network loading information and/or the QoS parameters and determines unicast loading and overload conditions, which are then sent to the BPS 120. Next, BPS 120 determines a level of unicast resource availability, based on the unicast loading and overload conditions, for enabling a successful broadcast session. BPS 120 then receives a policy, service definitions, and/or broadcast area characteristics from the policy database 125 and determines which bearer properties (e.g., GBR, MBR, QCI, and the like), if any, that need to be adjusted. The BPS 120 determines the bearer properties to be allocated for each multicast stream based on the unicast resource availability and according to the policy, service definitions, and/or broadcast area characteristics. The BPS 120 communicates the bearer property allocation for each multicast stream to the BMSC 130. The BMSC 130 then allocates the bearer properties to each one of the eNBs 110 via the MBMS-GW 135.

Although FIG. 1 shows that RAN EMS 115, BPS 120, policy database 125, BMSC 130, and MBMS-GW 135 are each separate physical hardware devices, it should be noted that each of the these network elements may be physically or logically grouped together, such that each of the above-mentioned devices may reside on one or more physical hardware devices. Furthermore, in some embodiments, communications network 100 may include many more components than those shown in FIG. 1. For example, communications network 100 may include a Mobility Management Entity (MME) that may be configured to track, page, and/or authenticate mobile terminals. By way of another example, communications network 100 may also include a Multicast Coordination Entity (MCE) that may be configured to allocate time and frequency resources for eMBMS transmissions. However, it is not necessary that all of these generally conventional components be shown in order to understand the illustrative embodiment as described above.

Figure 2:
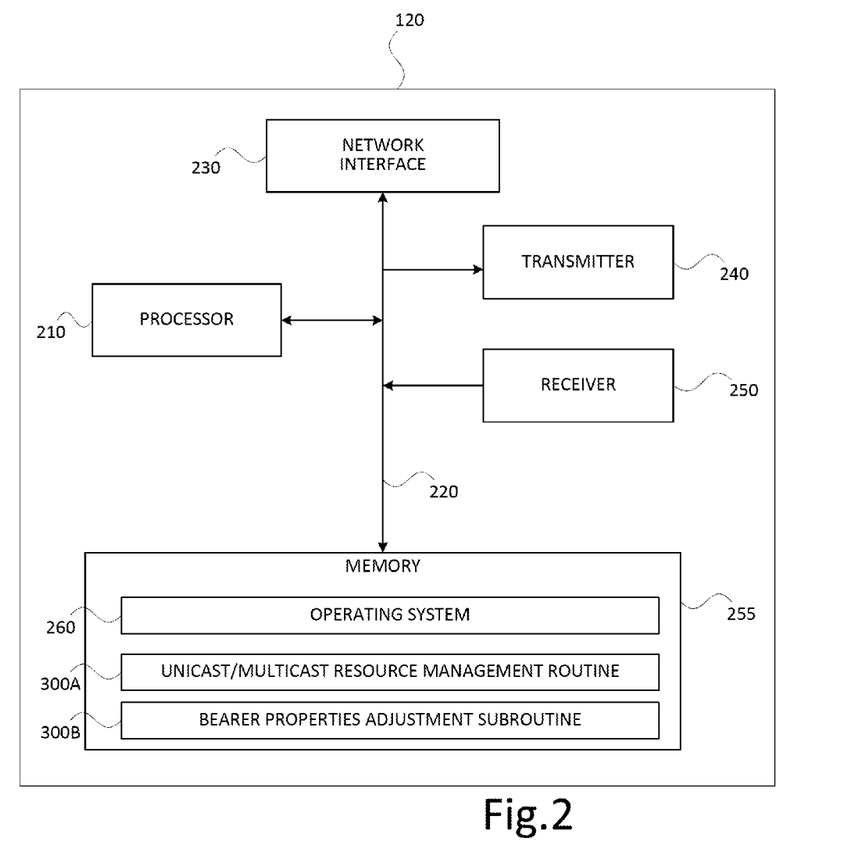
FIG. 2 illustrates the components of a broadcast provisioning server (BPS) being employed by a communication network according to an example embodiment.

FIG. 2 illustrates the components of BPS 120 that may be employed by a communication network (e.g., communications network 100) according to an example embodiment. It should be noted that the other devices (e.g., eNB 110, BMSC 130, and MBMS-GW 135) employed by the communications network 100 as shown in FIG. 1, may have the same or a similar configuration of components. As shown, BPS 120 includes central processing 210, bus 220, network interface 230, transmitter 240, receiver 250, and memory 255. During operation, memory 255 includes operating system 260, unicast/multicast resource management routine 300A, and bearer properties adjustment subroutine 300B. In some embodiments, BPS 120 may include many more components than those shown in FIG. 2. However, it is not necessary that all of these generally conventional components be shown in order to understand the illustrative embodiment.

Memory 255 may be a computer readable storage medium that generally includes a random access memory (RAM), read only memory (ROM), and a permanent mass storage device, such as a diskdrive. Memory 255 also stores operating system 260 and program code for unicast/multicast resource management routine 300A and bearer properties adjustment subroutine 300B. These software components may also be loaded from a separate computer readable storage medium into memory 255 using a drive mechanism (not shown). Such separate computer readable storage medium may include a floppy drive, disc, tape, DVD/CD-ROM drive, memory card, or other like computer readable storage medium (not shown). In some embodiments, software components may be loaded into memory 255 via network interface 230, rather than via a computer readable storage medium.

Processor 210 may be configured to carry out instructions of a computer program by performing the basic arithmetical, logical, and input/output operations of the system. Instructions may be provided to processor 210 by memory 255 via bus 220.

Bus 220 enables the communication and data transfer between the components of BPS 120. Bus 220 may comprise a high-speed serial bus, parallel bus, storage area network (SAN), and/or other suitable communication technology.

Network interface 230 is a computer hardware component that connects BPS 120 to a computer network. Network interface 230 may connect BPS 120 to a computer network via a wired or wireless connection.

Transmitter 240 may be any type of hardware device that may generate, or otherwise produce, radio waves in order to communicate with one or more other devices. Transmitter 240 may be coupled with an antenna (not shown) in order to transmit data to one or more other devices. Transmitter 240 may be configured to receive digital data from one or more components of BPS 120 via bus 220, and convert the received digital data into an analog signal for transmission over an air interface.

Receiver 250 may be any type of hardware device that can receive and convert a signal from a modulated radio wave into usable information, such as digital data. Receiver 250 may be coupled with an antenna (not shown) in order to capture radio waves. Receiver 250 may be configured to send digital data converted from a captured radio wave to one or more other components of BPS 120 via bus 220. In various embodiments, a transceiver (not shown) may be included with BPS 120. A transceiver may be a single component configured to provide the functionality of transmitter 240 and receiver 250 as discussed above.

Figure 3A:
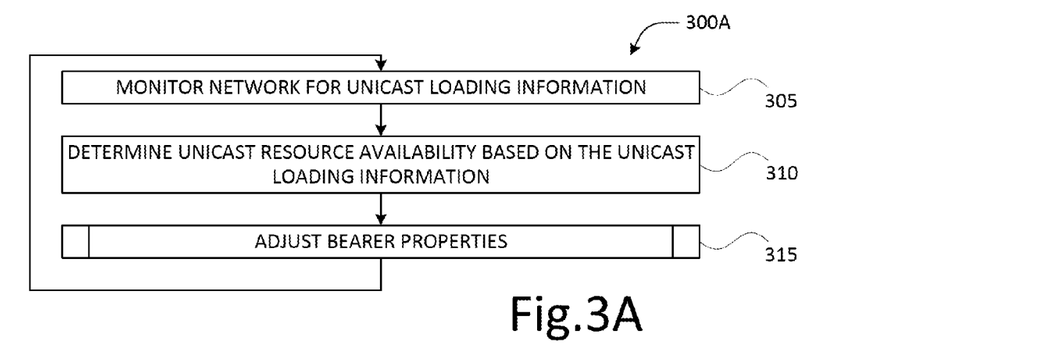
FIG. 3A shows a unicast/multicast resource management routine according to an example embodiment.
Figure 3B:
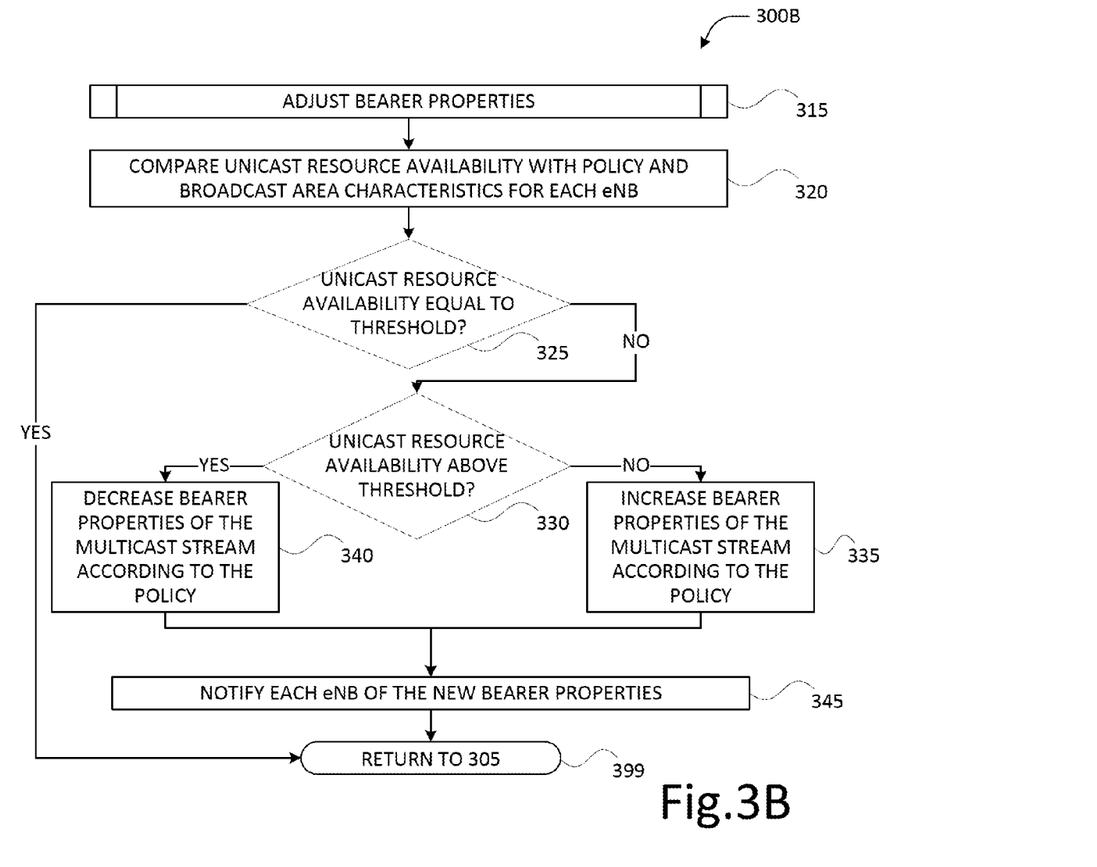
FIG. 3B shows a bearer properties adjustment subroutine according to an example embodiment.

FIGS. 3A-B shows a unicast/multicast resource management routine 300A and bearer properties adjustment subroutine 300B, according to an example embodiment. Unicast/multicast resource management routine 300A and bearer properties adjustment subroutine 300B may be used to manage network traffic by integrating unicast and multicast provisioning. For illustrative purposes, the operations of unicast/multicast resource management routine 300A and bearer properties adjustment subroutine 300B will be described as being performed by BPS 120. However, it should be noted that the network devices as shown in FIG. 1 may operate the unicast/multicast resource management routine 300A and bearer properties adjustment subroutine 300B as described below.

Referring to FIG. 3A, as shown in operation 305, BPS 120 monitors the network for unicast loading information. As discussed above, the mobile terminals 105 associated with the eNBs 110 may be configured to measure and record unicast network load information and QoS parameters. According to various embodiments, the measured unicast network load information and QoS parameters may be sent to BPS 120 via the eNBs 110 and/or RAN EMS 115. In various embodiments, the unicast network load information and QoS parameters may be sent to BPS 120 on a periodic and/or cyclical basis (e.g., at a certain time of day or at a time interval). In various embodiments, BPS 120 may poll, page, or otherwise request the unicast network load information and QoS parameters from the eNBs 110 via the RAN EMS 115.

As shown in operation 310, BPS 120 determines unicast resource availability based on the unicast loading information. As discussed above, BPS 120 may include a scheduling algorithm that describes a schedule of transmissions for a group of carriers at various radio frequencies at every time instant. Thus, BPS 120 may be configured to determine from the schedule an amount of network resources that are available in a given cell coverage from an amount of traffic that is scheduled to transmit one the carriers at the various radio frequencies at every time instant.

As shown in operation 315, BPS 120 adjusts the bearer properties via bearer properties adjustment subroutine 300B. BPS 120 then loops back to operation 305 to monitor the network for unicast loading information. It should be noted that in various embodiments, BPS 120 may loop back to operation 305 to monitor the network for unicast loading information before the bearer properties are adjusted, such that BPS 120 may monitor the network while the bearer properties are being adjusted. Accordingly, unicast/multicast resource management routine 300A and bearer properties adjustment subroutine 300B may operate concurrently or simultaneously.

Referring to FIG. 3B, as shown in operation 320, BPS 120 compares the unicast resource availability with a policy and broadcast area characteristics for each eNB. As is known, a policy may be one or more sets of conditions, constraints, and settings that designate or otherwise authorize certain user terminals to connect to a network and the circumstances under which the user terminals can or cannot connect to the network. According to various embodiments, a policy may define, designate or otherwise authorize a level or amount of network resources to be allocated to a multicast stream. The allocation of resources may be based on the available unicast resource availability, such that the resources for a given multicast stream may be increased or decreased based on the available resources in the communications network at a given time. The allocation of resources may also be based on the broadcast area characteristics or network topology, such that the resources for a given multicast stream may be increased or decreased based on the location of certain network elements and/or other like parameters. The allocation of resources may also be based on a service type of a multicast stream (e.g., video, VoIP, text, and the like), a user's subscription status or service definition, mobile device type, and/or other like characteristics. Additionally, in various embodiments, the allocation of resources may be based on received QoS measurements as measured by one or more user terminals (e.g., user terminals 105). The policy may set forth algorithms and/or definitions for adjusting bearer properties for multicast streams based on available (or unavailable) network resources and/or an amount of unicast traffic. Accordingly, BPS 120 may be configured to access a policy in order to determine an amount to increase or decrease bearer properties for multicast streams.

As shown in operation 325, BPS 120 determines if the unicast resource availability is equal to a threshold. As discussed above, the policy may set forth definitions for adjusting bearer properties for multicast streams based on available (or unavailable) network resources and/or an amount of unicast traffic. According to various embodiments, a threshold or other like reference values may be used to determine if bearer properties should be increased or decreased. In such embodiments, the threshold may be a minimum or maximum value that once exceeded or passed, triggers the BPS 120 to adjust the bearer properties. Therefore, BPS 120 may be configured to determine if unicast network loading conditions are equal to the threshold in order to maintain (or not adjust) the bearer properties. According to various embodiments, BPS 120 may also be configured to determine if received QoS measurements are equal to a QoS threshold in order to maintain (or not adjust) the bearer properties.

If BPS 120 determines that the unicast resource availability is equal to the threshold, BPS 120 loops to operation 399 to return to operation 305 to monitor the network for unicast loading information. If BPS 120 determines that the unicast resource availability is not equal to the threshold, then BPS 120 proceeds to operation 330 to determine if the unicast resource availability is above the threshold.

As shown in operation 330, BPS 120 determines if the unicast resource availability is above the threshold. If BPS 120 determines that the unicast resource availability is above the threshold, then as shown in operation 340, BPS 120 decreases bearer properties for multicast streams according to the policy. If at operation 330 the BPS 120 determines that the unicast resource availability is not above the threshold, then the unicast resource availability must be below the threshold and as shown in operation 335, BPS 120 increases the bearer properties for multicast streams according to the policy.

As discussed above, the policy may set forth algorithms and/or definitions for adjusting bearer properties for multicast streams based on available (or unavailable) network resources and/or an amount of unicast traffic. In such embodiments, the policy may define and increase amount to increase and a decrease amount, such that the bearer properties are increased by the increase amount if the unicast resource availability is determined to be below the unicast load threshold, and the bearer properties are decreased by the decrease amount if the unicast resource availability is determined to be above the unicast load threshold.

Additionally, as noted above, the bearer properties may include a minimum guaranteed bit rate (GBR), a maximum bit rate (MBR), a quality of service (QoS) class identifier (QCI), an allocation and retention priority (ARP), and other like properties. Accordingly, the policy may define an increase amount and a decrease amount for each one of the bearer properties. For instance, an increase amount and decrease amount for a GBR may be different than an increase amount and decrease amount for a QCI. Additionally, it should be noted that a bearer property's increase amount and decrease amount do not have to have the same value (e.g., the QCI increase amount may be equal to 2 whereas the QCI decrease amount may be equal to 1).

It should be noted that unicast/multicast resource management routine 300A and/or bearer properties adjustment subroutine 300B may also provide for determining whether a QoS value, which may be based on received QoS measurements, is one of above, equal to, and below a QoS value threshold in a similar manner as described above. Accordingly, BPS 120 may be configured to decrease the bearer properties by the decrease amount if the unicast resource availability is determined to be above the unicast load threshold and the QoS value is above the QoS value threshold, and to increase the bearer properties by the increase amount if the unicast resource availability is determined to be below the unicast load threshold and the QoS value is below the QoS value threshold.

As shown in operation 345, BPS 120 notifies, through BMSC 130, each of the eNBs 110 of the new bearer properties. As shown in operation 399, BPS 120 returns to operation 305 to monitor the network for unicast loading information. In various embodiments, BPS 120 may be configured to notify or otherwise communicate the bearer property allocation for each multicast stream to each one of the eNBs 110 via BMSC 130 and MBMS-GW 135, as discussed above.

The invention being thus described, it will be obvious that the same may be varied in many ways. Such variations are not to be regarded as a departure from the invention, and all such modifications are intended to be included within the scope of the present invention.

We claim:

1. A method for managing network resources for multicast streams in a communications network, the method comprising:
   receiving, by a network element unicast load condition information from the base station, the base station having received the unicast load condition information from a user equipment being serviced by the base station;
   determining a unicast resource availability based on the received unicast load condition information;
   receiving at least one quality of service (QoS) measurement associated with a unicast transmission from the base station, the base station having received the QoS measurement from the user equipment being serviced by the base station;
   determining at least one QoS value based on the at least one QoS measurement; and
   adjusting, by the network element, bearer properties for a multicast stream based on the determined unicast resource availability, the determined at least one QoS value, a first threshold and a second threshold.

2. The method of claim 1, wherein the adjusting comprises at least one of:

decreasing the bearer properties by a decrease amount if the unicast resource availability is determined to be above the first threshold;

increasing the bearer properties by an increase amount if the unicast resource availability is determined to be below the first threshold; and maintaining the bearer properties if the unicast resource availability is determined to be equal to the first threshold.

3. The method of claim 2, wherein a policy defines the first threshold, the increase amount, and the decrease amount.

4. The method of claim 2, wherein the adjusting further comprises at least one of:

decreasing the bearer properties by the decrease amount if the unicast resource availability is determined to be above the first threshold and the QoS value is above the second threshold;

increasing the bearer properties by the increase amount if the unicast resource availability is determined to be below the first threshold and the QoS value is below the second threshold; and maintaining the bearer properties if one of (i) the unicast resource availability is determined to be equal to the first threshold and (ii) the QoS value is determined to be equal to the second threshold.

5. The method of claim 4, wherein the policy further defines the second threshold and how to calculate the QoS value based on the QoS measurement, and the QoS measurement being at least one of call drop rate, a signal to noise ratio, a measure of throughput, a delay, a jitter, and a handover success rate.

6. The method of claim 5, wherein the bearer properties include a guaranteed bit rate (GBR), and the policy defines the increase amount to include a GBR increase amount for increasing the GBR and the decrease amount to include a GBR decrease amount for decreasing the GBR.

7. The method of claim 6, wherein the bearer properties further include a maximum bit rate (MBR), and the policy defines the increase amount to include a MBR increase amount for increasing the MBR and the decrease amount to include a MBR decrease amount for decreasing the MBR.

8. The method of claim 7, wherein the bearer properties further include a QoS class identifier (QCI), and the policy defines the increase amount to include a QCI increase amount for increasing the QCI and the decrease amount to include a QCI decrease amount for decreasing the QCI.

9. A broadcast provisioning server (BPS) configured to manage network resources for multicast streams in a communications network, the BPS comprising:

a memory having computer readable instructions stored therein; and a processor, which when executing the instructions, is configured to:

receive unicast load condition information from a base station, the base station having received the unicast load condition information from a user equipment being serviced by the base station;

determine a unicast resource availability based on the received unicast load condition information;

receive at least one quality of service (QoS) measurement associated with a unicast transmission from the base station, the base station having received the QoS measurement from the user equipment being serviced by the base station;

determine at least one QoS value based on the at least one of QoS measurement; and adjust bearer properties for a multicast stream based on the determined unicast resource availability, the determined at least one QoS value, a first threshold and a second threshold.

10. The BPS of claim 9, wherein the processor is further configured to adjust the bearer properties by:

decreasing the bearer properties by a decrease amount if the unicast resource availability is determined to be above the first threshold;

increasing the bearer properties by an increase amount if the unicast resource availability is determined to be below the first threshold; and maintaining the bearer properties if the unicast resource availability is determined to be equal to the first threshold.

11. The BPS of claim 10, wherein a policy defines the first threshold, the increase amount, and the decrease amount.

12. The BPS of claim 10, wherein the processor is further configured to adjust the bearer properties by:

decreasing the bearer properties by the decrease amount if the unicast resource availability is determined to be above the first threshold and the QoS value is above the second threshold;

increasing the bearer properties by the increase amount if the unicast resource availability is determined to be below the first threshold and the QoS value is below the second threshold; and maintaining the bearer properties if one of (i) the unicast resource availability is determined to be equal to the first threshold and (ii) the QoS value is determined to be equal to the second threshold.

13. The BPS of claim 12, wherein the policy further defines the second threshold and how to calculate the QoS value based on the QoS measurement, and the QoS measurement being at least one of call drop rate, a signal to noise ratio, a measure of throughput, a delay, a jitter, and a handover success rate.

14. The BPS of claim 13, wherein the bearer properties include a guaranteed bit rate (GBR), and the policy defines the increase amount to include a GBR increase amount for increasing the GBR and the decrease amount to include a GBR decrease amount for decreasing the GBR.

15. The BPS of claim 14, wherein the bearer properties further include a maximum bit rate (MBR), and the policy defines the increase amount to include a MBR increase amount for increasing the MBR and the decrease amount to include a MBR decrease amount for decreasing the MBR.

16. The BPS of claim 15, wherein the bearer properties further include a QoS class identifier (QCI), and the policy defines the increase amount to include a QCI increase amount for increasing the QCI and the decrease amount to include a QCI decrease amount for decreasing the QCI.

* * * * *